Figure 1:
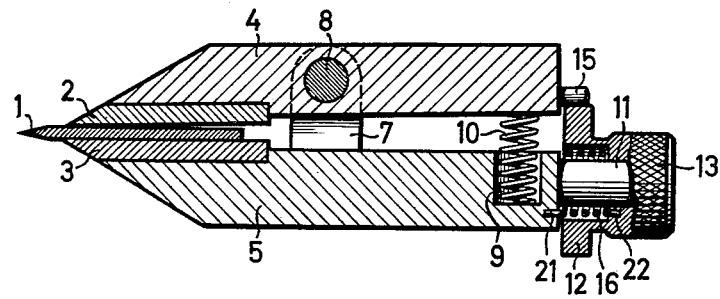

Dec. 18, 1962   D. BRAUN   3,068,734
GUIDE APPARATUS FOR CUTTER BANDS
Filed July 20, 1960

Inventor
Dieter Braun
By
Michael S. Striker
Attorney

United States Patent Office

3,068,734
Patented Dec. 18, 1962

3,068,734
GUIDE APPARATUS FOR CUTTER BANDS
Dieter Braun, Stuttgart-Bad Canstatt, Germany, assignor to Fortuna-Werke Spezialmaschinenfabrik A.G., Stuttgart-Bad Canstatt, Germany
Filed July 20, 1960, Ser. No. 44,187
Claims priority, application Germany July 25, 1959
6 Claims. (Cl. 83—582)

The present invention relates to a guide apparatus for cutter bands and similar movable elements, and more particularly to a guide apparatus for guiding the flexible cutter band of a cutting machine of the type used for cutting and splitting leather and felt, as well as in the manufacture of shoes.

In machines of this type, a cutter band runs at comparatively great speed, for example between 3 and 5 m./sec., in a gap between a pair of guide means and is supported by the same in the region in which the cutter band is applied to the workpiece.

The cutter band is thin and very flexible, and it is desired to guide the cutter band without play, so that it cannot flutter or laterally yield under the pressure of the workpiece. Otherwise, the quality of the work is impaired.

The constructions of the prior art permit an adjustment of the guide means to a position in which the cutter band runs without play, however, since the parts of the guide means along which the cutter band slides, are worn off, play develops which detrimentally affects the desired exact operation. This condition may be corrected by manual adjustment of the guide means, but under practical conditions, it frequently occurs that the cutter band has either too much play, or is almost clamped between the guide means so that it is heated by friction, which may lead to damage to the guide means, particularly in view of the fact that lubrication is undesirable since it may cause damage to the delicate workpieces.

It is also known to provide resilient guide means. This construction, however, has the disadvantage that the spring pressure becomes insufficient when substantial resistance is encountered during an operation on a very hard workpiece, while on the other hand very strong springs will produce such pressure that heating and excessive wear of the guide means would occur during normal operations.

It is the object of the present invention to overcome the disadvantages of the prior art constructions, and to provide guide apparatus obtaining automatic adjustment of guide means, while preventing deformation of a flexible guided element, such as a cutter band, when pressed against a workpiece.

Another object of the present invention is to provide a guide apparatus of this type in which the pressure of the guide means against the guided element is limited, while no pressure exerted by the guided element on the guide means can effect displacement of the guide means.

Another object of the present invention is to provide a guide apparatus of this type, which automatically adjusts itself to compensate for wear on the guide means, but provides a rigid support for the guide means even in the adjusted positions.

A further object of the present invention is to use a self-locking wedge means for blocking movement of the guide means under the pressure of the workpiece out of the proper guiding position.

With these objects in view, the present invention mainly consists in a guide apparatus for a movable element, such as a cutter band. One embodiment of the present invention comprises a pair of guide means defining between each other a gap for guiding the cutter band; first biasing means for urging one of the guide means into an operative position in which both guide means abut the cutter band for guiding the same; and a control means including a blocking member, preferably a self-locking wedge member, movable to a blocking position abutting the movable guide means to block movement of the same out of the operative position.

The wedge member is preferable manually set, while second biasing means urge the wedge member to an adjusted blocking position when the gap between the guide means decreases due to wear of the guide means.

In the preferred embodiment of the present invention, the biasing means are springs, which are so dimensioned that the pressure of the guide means on the cutter band is just right, while the spring pressure on the blocking wedge member is just sufficient for adjustment of the blocking member but has no substantial influence on the pressure applied by the guide means to the guided cutter band.

In the preferred embodiment of the present invention, the blocking member is a manually turnable eccentric member having a arcuate wedge face which is constructed in such a manner that even great pressure of the guide means is incapable of turning the eccentric member to a position releasing the guide means. A torsion spring tends to turn the eccentric member to an adjusted blocking position when the gap between the guide means is reduced due to wear of the guide means.

Figure 2:
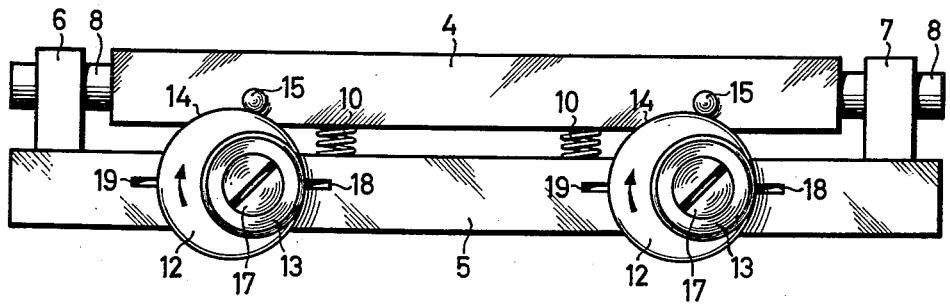

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a cross-sectional view of a guide apparatus according to one embodiment of the present invention; and FIG. 2 is a rear view of the apparatus shown in FIG. 1.

Referring now to the drawings, a cutter band 1 is guided bewteen a pair of replaceable hard inserts 2 and 3 in a pair of plates 4 and 5. Plate 5 is fixedly mounted on a support, not shown, and carries a pair of bearing members 6 and 7 for a shaft 8 on which plate 4 is supported for turning movement about the axis of shaft 8. The non-movable plate 5 has a pair of recesses 9 housing springs 10 which abut against the movable plate 4 to urge the same to turn into a position in which the gap between the inserts 2 and 3 is reduced so that the inserts abut the cutter band 1 and guide the same. Plate 5 has a pair of projecting pins 11, and plate 4 has a pair of projecting pins 15.

A pair of control means is mounted on pins 11. Each control means includes an eccentric portion 12 having a circular eccentric face 14, and a manually operated knob 13. A screw 17 is screwed into each pin 11 to hold the eccentric member thereon.

Each eccentric member has a cavity housing a torsion spring 16, one end of which is secured in a recess 22 of knob 13, while the other end is secured to a recess 21 in plate 5. Springs 16 tend to turn the eccentric members 12 in clockwise direction as indicated by the arrows in FIG. 2 so that the eccentric circular faces 14 are in engagement with pins 15. A pair of stops 18 and 19 on eccentric member 12 limit turning movement of the same by engagement with the respective pins 15.

The device is operated in the following manner: In the normal position of the apparatus the first biasing means 10 urge the movable guide means 2, 4, 15 to turn to the illustrated operative position in which the cutter band 1 is guided between the two guide means. In this position, the two eccentric members 12 are manually adjusted by operation of knob 13 so that the arcuate wedge faces 14 just engage the pins 15 of the movable guide means 2, 4, 15. The second biasing means 16 tend to hold the eccentric members 12 in this position.

During a following cutting operation, the guide means exert a pressure on the cutter band 1 determined by the suitable selection of the biasing spring means 10, and such pressure is selected in accordance with a type of workpiece on which the operation is to be carried out, and considering that the pressure of the guide means on the cutter band should not be so great as to produce excessive wear.

In the event that the cutter band encounters substantial resistance at one point of the workpiece, and tends to be deflected out of its normal operating plane, the guide means are prevented from moving apart, since such excessive pressure is transmitted by pins 15 to the eccentric members 12.

Even under great pressure, the eccentric members 12 cannot turn in counterclockwise direction to release pins 15, since the arcuate wedge faces 14 between stops 18 and 19 have such a diameter and position relative to pins 15 as to be self-locking. Furthermore, the torsion springs 16 resist such turning movement in counterclockwise directions.

When the inserts 2, 3 of the guide means are slightly worn off, the gap will be automatically adjusted by the first biasing means 10. This will cause a movement of pins 15 away from the arcuate faces 14. Turning movement of the eccentric members 12 in clockwise direction is no longer blocked by pins 15, so that torsion springs 16 are strong enough to turn eccentric members 12 until another pair of portions of the arcuate wedge faces 14 abuts on pins 15, holding guide means 2, 4, 15 in the newly adjusted position into which they were urged by the biasing means 10. It is evident, that the guiding pressure produced by the biasing means 10 remains the same as before, and that even excessive pressure cannot force the movable guide means out of its operative position, since pins 15 again abut on the eccentric members 12 and are incapable of turning the same in counterclockwise direction against the action of springs 16.

It will be understood by those skilled in the art that instead of turnable eccentric members, flat wedge members can be used, which are shiftable transverse to the direction of movement of the pins 15, and have inclined wedge faces slidably engaging pins 15.

From the above description of a preferred embodiment of the present invention it will become apparent that the first biasing means 10 are only used for producing the desired guiding pressure, but are not used for taking up excessive pressures which may develop during an operation. Consequently, springs 10 can be dimensioned only in view of the guiding of the cutter band. Exessive pressure which may cause displacement of the guide means is taken up by rigid blocking members so that the cutter band cannot be laterally deflected to damage the workpiece. Since such excessive pressure forces occur only momentarily, the cutter band is not excessively heated nor is substantial wear caused on the inserts 2 and 3.

The normal operating pressure must be produced by the biasing springs 10, and not by the blocking wedge members 12, 14 which are only set to engage pins 15, but are not turned so far as to force the movable guide means against the cutter blade. Due to the low efficiency of wedges, particularly in the self-locking range and due to the variable friction coefficients, the wedge members are not suited for producing the desired normal pressure on the guided cutter band 1, and such pressure must be produced by the biasing springs 10.

It will be understood that each of the elements described above, or two or more together, may also find a useful application in other types of guide apparatus for movable elements differing from the types described above.

While the invention has been illustrated and described as embodied in an automatically adjusting guide apparatus for a cutter band, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Guide apparatus comprising in combination a pair of guide means defining between each other a gap for guiding a movable element, one of said guide means being freely movable toward and away from the other guide means to and from an operative position in which said guide means abut the movable element; first resilient biasing means for urging said movable guide means into and beyond said operative position so that resilient pressure is exerted by said guide means on the movable element; and a control means including a blocking member movable to a blocking position abutting said movable guide means to block movement of the same out of said operative position when the pressure exerted by the movable element on said guide means exceeds said resilient pressure, and second biasing means for urging said blocking member into an adjusted blocking position when said movable guide means moves toward said other guide means due to wear of said guide means.

2. Guide apparatus comprising in combination a pair of guide means defining between each other a gap for guiding a movable element, one of said guide means being freely movable toward and away from the other guide means to and from an operative position in which said guide means abut the movable element; first resilient biasing means for urging said movable guide means into and beyond said operative position so that resilient pressure is exerted by said guide means on the movable element; and a control means including a blocking wedge member movable in a direction transverse to the direction of movement of said movable guide means to a blocking position abutting said movable guide means so as to block movement of said movable guide means out of said operative position when the pressure exerted by the movable element on said guide means exceeds said resilient pressure, and second biasing means for urging said blocking wedge member into an adjusted blocking position when said movable guide means moves toward said other guide means due to wear of said guide means.

3. Guide apparatus comprising in combination a pair of guide means defining between each other a gap for guiding a movable element, one of said guide means being freely movable toward and away from the other guide means to and from an operative position in which said guide means abut the movable element; first resilient biasing means for urging said movable guide means into and beyond said operative position; and a control means including a self-locking blocking wedge member manually movable in a direction transverse to the direction of movement of said movable guide means to a blocking position abutting said movable guide means and locked against movement in the opposite direction so as to block movement of said movable guide means out of said operative position when the pressure exerted by the movable element on said guide means exceeds said resilient pressure.

4. Guide apparatus comprising in combination a pair of guide means defining between each other a gap for guiding a movable element, one of said guide means being freely movable toward and away from the other guide means to and from an operative position in which said guide means abut the movable element; first spring means for urging said movable guide means into and beyond said operative position so that resilient pressure is exerted by said guide means on the movable element; and control means including a manually adjustable eccentric member mounted on one of said guide means for turning movement under manual control to a blocking position, said eccentric member having an arcuate self-locking wedge portion abutting the respective other guide means in said blocking position when said movable guide means is in said operative position so as to block movement of said movable guide means out of said operative position when the pressure exerted by the movable element on said guide means exceeds said resilient pressure, and a torsion spring for turning said eccentric member to an adjusted blocking position when said movable guide means moves toward said other guide means due to wear of said guide means.

5. A guide apparatus as set forth in claim 4 wherein said pair of guide means includes a non-movable guide means; wherein said eccentric member is mounted on said non-movable guide means for turning movement and has a projecting knob and a cavity, and wherein said torsion spring is mounted in said cavity and has one end secured to said eccentric member and the other end secured to said non-movable guide means.

6. Guide apparatus comprising in combination a pair of guide means defining between each other a gap for guiding a movable element, one of said guide means being freely movable toward and away from the other guide means to and from an operative position in which said guide means abut the movable element; resilient biasing means for urging said movable guide means into and beyond said operative position so that resilient pressure is extered by said guide means on the movable element; a control means including a manually adjustable eccentric member mounted on one of said guide means for turning movement in one direction to a blocking position, said eccentric member having a self-locking wedge portion abutting the respective other guide means in said blocking position when said movable guide means is in said operativet position so that said movable guide means cannot turn said eccentric member in the opposite direction whereby movement of said movable guide means out of said operative position is blocked when the pressure exerted by the movable element on said guide means exceeds said resilient pressure; and other biasing means for turning said eccentric member in said one direction to an adjusted blocking position when said movable guide means moves toward the respective other guide means due to wear of said guide means.

References Cited in the file of this patent

UNITED STATES PATENTS

| | | |
|---|---|---|
| 472,122 | Hopkins | Apr. 5, 1892 |
| 1,385,673 | Faulkner | July 26, 1921 |
| 1,826,757 | Falls | Oct. 13, 1931 |